United States Patent [19]

Nakamura et al.

[11] Patent Number: 5,036,328
[45] Date of Patent: Jul. 30, 1991

[54] PULSE COMPRESSING APPARATUS FOR A RADAR SYSTEM USING A LONG PULSE

[75] Inventors: Hiroshi Nakamura; Eiichi Kiuchi, both of Tokyo, Japan

[73] Assignee: NEC Corporation, Tokyo, Japan

[21] Appl. No.: 531,364

[22] Filed: May 31, 1990

[30] Foreign Application Priority Data

May 31, 1989 [JP] Japan .................................. 1-138053

[51] Int. Cl.$^5$ .............................................. G01S 13/28
[52] U.S. Cl. ..................................... 342/204; 342/201
[58] Field of Search ....................... 342/204, 195, 201

[56] References Cited

U.S. PATENT DOCUMENTS 3,747,099  7/1973  Wong ................................. 342/201
4,566,010  1/1986  Collins ............................... 342/201
4,833,479  5/1989  Carlson ......................... 342/201 X Primary Examiner—Gilberto Barrón, Jr.
Attorney, Agent, or Firm—Sughrue, Mion, Zinn, Macpeak & Seas

[57] ABSTRACT

A pulse compressing apparatus for use in a radar system receives an input signal data stream which has been received by the radar system and which corresponds to a transmitted long pulse. A weight coefficient generator generates the same number of weight coefficients as the number of input signal values in the input signal data stream. The same number of arithmetic units is provided and the weight coefficients are sequentially transferred to each arithmetic means where they are processed with the input signal values. The results of the processing from the arithmetic units are added together to produce a compressed pulse output.

9 Claims, 3 Drawing Sheets

FIG. 4 (a) INPUT SIGNAL (COMPLEX SIGNAL)

| $X_0$ | $X_1$ | $X_2$ | ------ | $X_{N-1}$ | $X_N$ | $X_{N+1}$ |

FIG. 4 (b) OPERATION IN ARITHMETIC UNIT 116

$$\sum_{i=0}^{N-1} X_i W_i$$

FIG. 4 (c) OPERATION IN ARITHMETIC UNIT 116

$$\sum_{i=1}^{N} X_i W_{i-1}$$

FIG. 4 (d) FILTER COEFFICIENT FOR ARITHMETIC UNIT 116

| $W_0$ | $W_1$ | ------ | $W_{N-1}$ |

FIG. 4 (e) FILTER COEFFICIENT FOR ARITHMETIC UNIT 116

| $W_0$ | ------ | $W_{N-2}$ | $W_{N-2}$ |

PULSE COMPRESSING APPARATUS FOR A RADAR SYSTEM USING A LONG PULSE

BACKGROUND OF THE INVENTION

The present invention relates to a radar system using a long pulse, and more particularly to a pulse compressing apparatus which is required when a received long pulse reflected from a target is to be converted into a radar video signal.

In such a radar system, a long pulse, whose carrier frequency is subject to linear modulation or linearly changes with a chirp signal, is used, because the long pulse is more advantageous in range resolution and accuracy and also it provides greater transmit pulse energy while applying a pulse compression operation. Where such a long pulse is used, the pulse should be compressed as disclosed, for example, in Merrill I. Skolnik, Introduction to RADAR SYSTEMS, International student edition (McGraw-Hill KOGAKUSHA, LTD., 1962), 10.9 Pulse Compression in Chapter 10.

This pulse compression can be represented by correlation processing indicated by Equation (1):

Pulse compression output y(t)

$$= \int_{-\infty}^{\infty} x_r(\tau) \cdot \text{ref}(t + \tau) d\tau \quad (1)$$

where $x_r(\tau)$ is a received signal and ref (t), a reference signal. Whereas the reference signal is so determined as to maximize the compressed output, or as to result in a matched filter, the complex conjugate signal of a transmitted signal is used as the reference signal because the received signal is a reflection of the transmitted signal.

It is known to those skilled in the art that correlation processing in the time domain can be represented by a multiplication in the frequency domain, so that the Equation (1) can be represented by Equation (2) below in the frequency domain:

$$Y(f) = X_r(f) \cdot X^*_t(f) \quad (2)$$

where Y(f) is the Fourier transform of the compressed output y(t); $X_r(f)$, that of the received signal $x_r(t)$; $X^*_t(f)$, that of the complex conjugate signal of the transmitted signal (i.e. the reference signal ref(t))

A digital pulse compressing apparatus according to the prior art is a materialization of Equation (2), and may have such a configuration as illustrated in FIG. 1, for instance. Referring to FIG. 1, a received signal and a transmitted signal (which is a complex conjugate signal) are respectively sampled and converted into digital signals by analog-to-digital (A/D) converters 201a and 201b and, after effects of the sampling are reduced by window function processors 202a and 202b, undergo a Fourier transformation at high speed by fast Fourier transform (FFT) processors 203a and 203b. The outputs of the FET processors 203a and 203b are multiplied by a mulTiplier 204, and the multiplied output undergoes inverse FFT processing by an inverse FFT processor 205 to give a pulse compressed signal in the time domain.

Since a radar system which, because of its task to scan space, requires pulse compression on a real time basis, pipeline FFT processors as the FFT processors 203a and 203b are often utilized. Such pipeline FFT processors are described in detail, for instance, in the U.S. Pat. No. 4,222,050, "Moving Target Indication Radar".

In a radar system, conditions to the distance to the target to be tracked and the state of clutter are not constant but vary, so that the system should be adaptively responsive to such variations. A radar system using a long pulse can meet this requirement by adaptively altering the pulse compression ratio. As well known, the pulse compression ratio is defined by $B_{96}$ where $\tau$ is a duration of the long pulse and $B = f_2 - f_1$, a carrier frequency change from $f_1$ to $f_2$ over the duration. Thus, in order to alter the pulse compression ratio, the number of sampled data points to be processed in digital pulse compression processing, corresponding to the duration of the long pulse, is altered.

In the prior art digital pulse compressing apparatus described above which uses FFT processing, however, the number of sampled data points to be processed is fixed, and it is difficult to alter this number. In the pipeline FFT processor for real time continuous FFT processing in particular, in order to change the number of data points to be processed the extent of delay by a delay means and the number of processing stages should be changed, entailing an extremely complex configuration. There would further be required window function processing to suppress the effects of sampling and an inverse FFT processor to return the signal domain from the frequency domain to the time domain A digital pulse compressing apparatus using conventional FFT processing therefore involves the problem that it is difficult to adaptively alter the pulse compression ratio while achieving real time continuous processing.

SUMMARY OF THE INVENTION

An object of the present invention, therefore, is to provide a pulse compressing apparatus for a radar system using a long pulse, capable of permitting the adaptive alteration of the pulse compression ratio while performing real time continuous processing.

According to the invention, there is provided a digital pulse compressing apparatus for use in a radar system, transmitting a long pulse including a modulated signal within, to convert a received long pulse signal into a short pulse signal, comprising a weight coefficient generator for generating a series of weight coefficients each modified by a window function factor as a filter coefficient; a timing controller for generating a timing signal to determine the operational timing; a plurality of (N) arithmetic units for performing a prescribed filter operation at a timing determined by the timing signal on the basis of an input signal obtained by phase detection of the received long pulse and on the basis of the filter coefficients; and an adder for adding the outputs of the N arithmetic units, wherein each of said N arithmetic units includes first and second delay means for receiving the filter coefficient signals and the timing signal, respectively, and the N arithmetic units serially transfer the filter coefficients and the timing signal via the first and second delay means of each, the apparatus being cable of adaptively altering the pulse compression ratio by adaptively working only a desired number of the arithmetic units, from the first stage, among the total of N.

Next will be described the principle of the present invention. In order to adaptively alter the pulse compression ratio while achieving pulse compression on a real-time basis, processing is accomplished in the time domain instead of using the FFT processing in the frequency domain as shown by the prior art pulse compressor of FIG. 1. Now, to make possible digital processing, Equation (1) is quantized to obtain Equation (3), which represents pulse compression for a discrete signal:

$$y(k) = \sum_{i=0}^{N-1} w(i) \cdot x(i + k) \quad (3)$$

where w(i) is a weight coefficient. The configuration to realize this Equation (3) is shown in FIG. 2, which is well known as a transversal filter.

In FIG. 2, this transversal filter has constituent units each comprising a combination of an arithmetic element 401 and a delay 402. Further, as many such units as the number of points to be processed are connected in cascade and an adder 410 adds the outputs of the arithmetic elements 401 so as to realize Equation (3). This transversal filter, if the value of the weight coefficient to be provided to each arithmetic element 401 is made by the product of a general weighting coefficient factor and a window function factor in advance, can achieve window function processing simultaneously with pulse compression processing. If delivery or inhibition of the output of each arithmetic element to be supplied to the adder 410 is controlled and the weight coefficient is respectively varied, the pulse compression ratio can be adaptively altered in principle.

However, in order to alter the pulse compression ratio in the transversal filter of FIG. 2, each arithmetic element should be individually given a weight coefficient and, moreover, a control signal itself should be individually provided to each arithmetic element with due consideration for its operational timing, resulting in an extremely complex configuration, which is virtually impossible to realize. The present invention, according to the characteristic configuration described above, permits simple and ready alteration of the pulse compression ratio.

Thus, in the pulse compressing apparatus according to the invention, the filter coefficients and the timing signal are simply transferred sequentially from the arithmetic unit of the first stage to that of the final stage while being delayed by a prescribed time period at each stage, but there is no need for individual control. Meanwhile, an input complex signal (a phase detected received signal), which has the form of a series of sampled values, is directly supplied in parallel to all of the arithmetic units Each arithmetic unit performs a filtering operation of the input complex signal on the basis of the filter coefficients, and its arithmetic result is outputted in accordance with the entered timing signal. The outputs are added with the predetermined relationship of time delays therebetween. As a result, there is performed pulse compression processing in the time domain, and window function processing can also be executed at the same time. The pulse compression ratio can be readily altered only by varying the number of arithmetic units at work.

BRIEF DESCRIPTION OF THE DRAWINGS

FIG. 4 is a diagram for describing the arithmetic operation according to the present invention.

PREFERRED EMBODIMENT OF THE INVENTION

Figure 1:
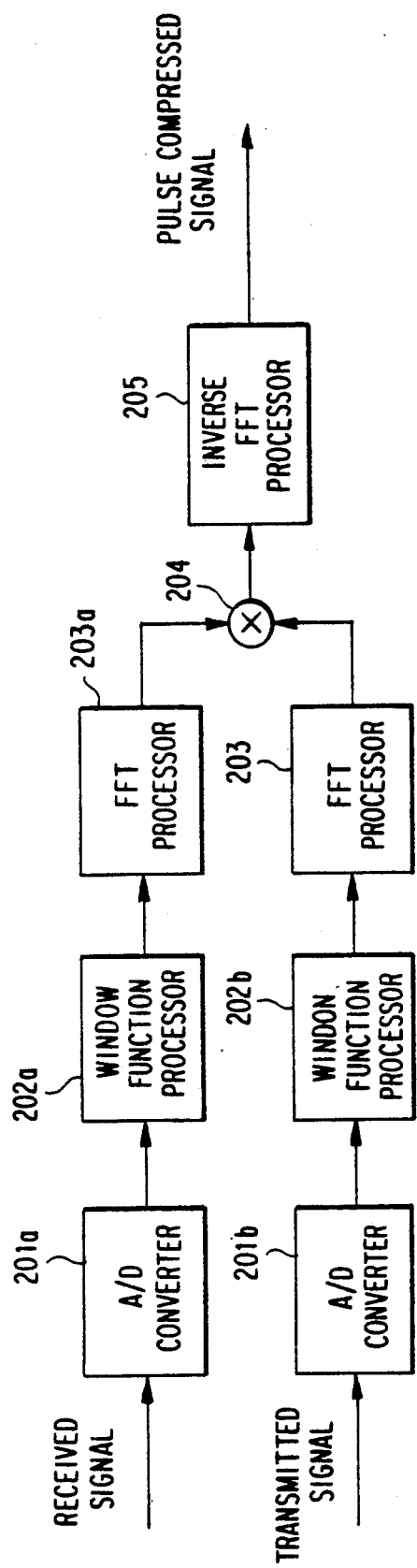
FIG. 1 is a block diagram illustrating a digital pulse compressing apparatus according to the prior art.
Figure 2:
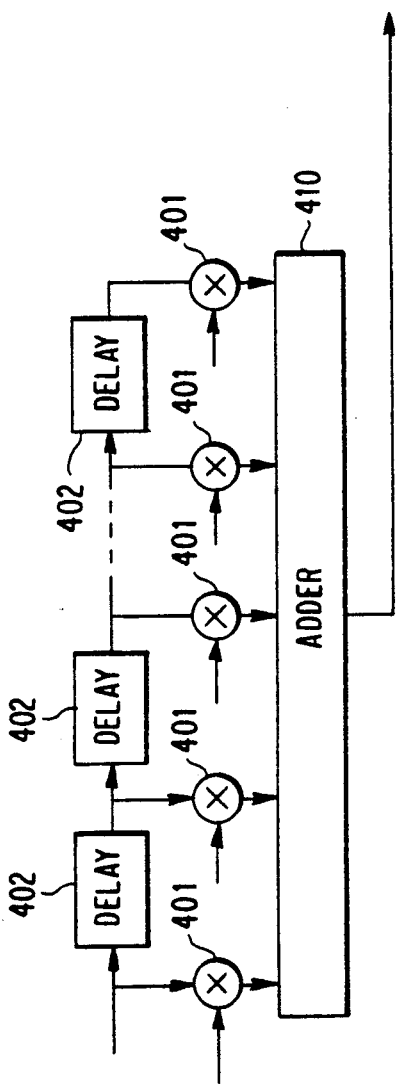
FIG. 2 illustrates a typical configuration of a conventional transversal filter.
Figure 3:
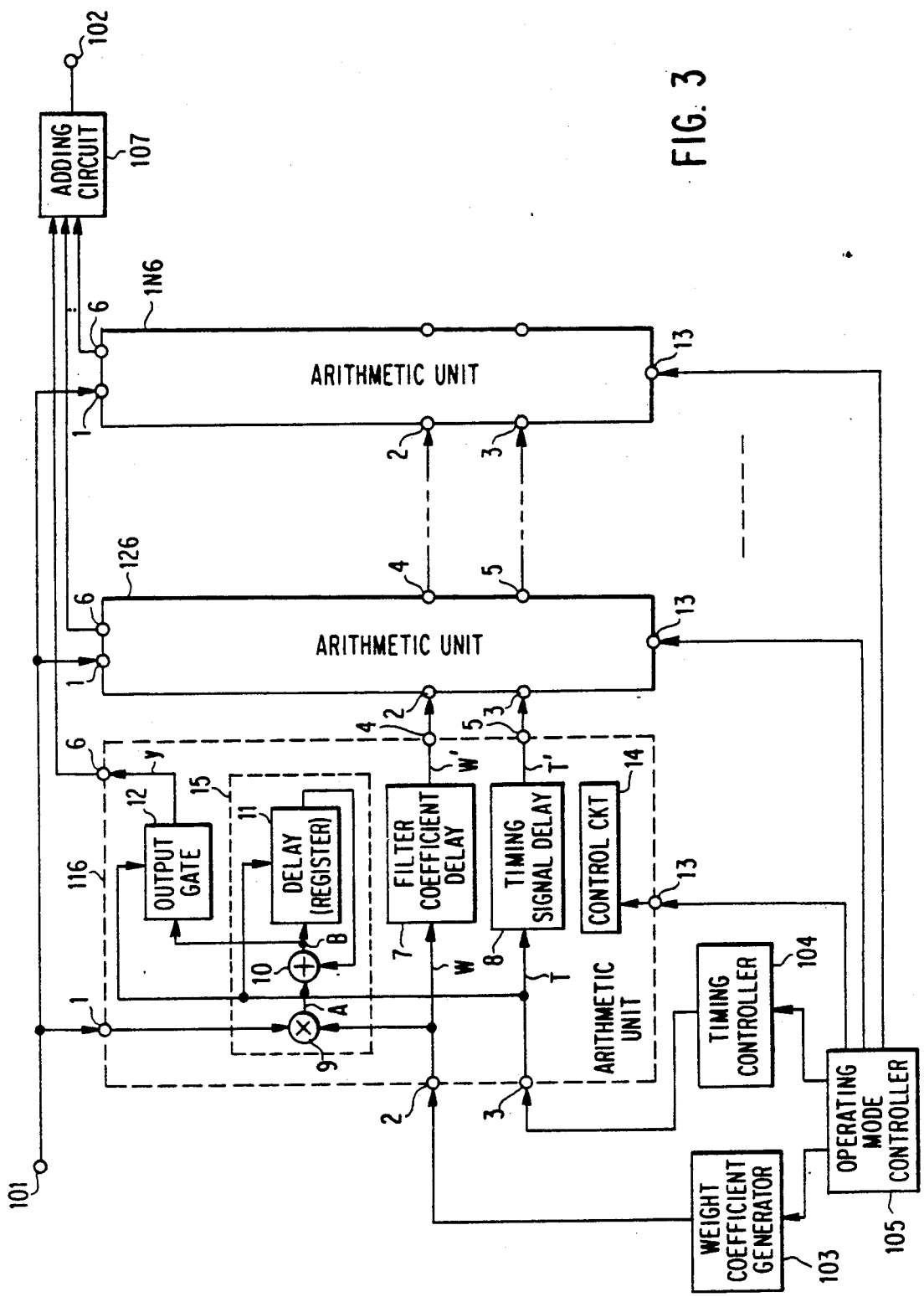
FIG. 3 is a block diagram illustrating a preferred embodiment according to the present invention.

Referring to FIG. 3 illustrating a preferred embodiment of the present invention, a digital pulse compressing apparatus of the present invention is equipped with an input terminal 101 for receiving an input complex signal, an output terminal 102 for supplying a compressed pulse output, a weight coefficient generator 103 for generating a weight coefficient (filter coefficient) modified by a window function factor, a timing controller 104 for supplying a timing signal to determine delivery of arithmetic result, an operating mode controller 105 for altering the pulse compression ratio according to the conditions of a radar system, a plurality of arithmetic units 116, 126 . . . , 1N6 connected in cascade so that the filter coefficient and the timing signal can be serially supplied, and an adding circuit 107 for adding the outputs of the arithmetic units 116 to 1N6. In this figure, the input complex signal from the input terminal 101 is supplied in parallel to terminals 1 of all of the arithmetic units 116 to 1N6. The input complex signal, as is well known to those skilled in the art with respect to a coherent radar system, is obtained by phase-detecting a received signal with phase-references having a 90° phase difference and by A/D-converting them in a predetermined sampling period. This is described in the U.S. Pat. No. 4,222,050 referred to above, for example. The weight coefficient generator 103 generates the N filter coefficients $w_0$ to $w_{N-1}$ each of which corresponds to N data from $x_0$ to $x_{N-1}$ in the complex signal and is the product of a conventional weighting factor and a window function factor (to be described in detail below). These filter coefficients are entered to a filter coefficient input terminal 2 of the arithmetic unit 116 of the first stage. A plurality of kinds of the filter coefficients are stored in advance in the weight coefficient generator 103 in correspondence to different types of radar processing, and selection therebetween is performed in accordance with a control by the operating mode controller 105. Further, the number of filter coefficients is varied as the pulse compression ratio is altered. The timing signal from the timing controller 104 is supplied to a timing input terminal 3 of the arithmetic unit 116. The repeating cycle of the timing signal from the timing controller 104 can be altered with the control of the operating mode controller 105.

Furthermore, each of the arithmetic units 116 to 1N6 has an output terminal 4 for supplying a delayed filter coefficient to the arithmetic unit of the next stage, another output terminal 5 for supplying a delayed timing signal to the arithmetic unit of the next stage, an arithmetic result output terminal 6, and an input terminal 13 for receiving a control signal from the operating mode controller 105. The arithmetic units 116 to 1N6 are connected in cascade such that the filter coefficient output terminal 4 and the timing control signal output terminal 5 of the arithmetic unit at a previous stage are connected to the filter coefficient input terminal 2 and the timing signal input terminal 3, respectively, of the arithmetic unit at the next stage.

All these arithmetic units 116 to 1N6 are identically structured and, as illustrated with respect to the arithmetic unit 116, each comprises a filter coefficient delay 7 having a delay time corresponding to the data sampling period and disposed between the input and output terminals 2 and 4, a timing signal delay 8 having the same delay time as the delay 7 and disposed between the input and output terminals 3 and 5, a filtering circuit 15 including a multiplier 9, an adder 10 and a delay 11 having the same delay time as the delay 7, and a control circuit 14 responsive to the control signal from the operating mode controller 105 for activating or inactivating the corresponding arithmetic unit. Since the two delays 7 and 8 of each of the arithmetic units are connected in cascade over the N stages, the filter coefficient and the timing signal are successively transferred from the first arithmetic unit 116 to the final arithmetic unit 1N6.

To describe hereupon the operation of the filtering circuit 15, the multiplier 9 multiplies the filter coefficient and the input complex signal, and the adder 10 adds the output of the multiplier 9 and that of the delay 11 to supply the sum to the delay 11 and to an output gate 12. Therefore, the filtering circuit 15 successively adds the output of the multiplier 9 and, while the sum result is delivered via the output gate 12 at a timing determined by the timing signal and, by this timing, the stored data in the delay 11 is cleared. As a result, filtering operation is executed in each arithmetic unit at the processing timing for instance as shown in FIGS. 4 (a) to (e).

Referring to FIGS. 4 (a) to (e), it is now considered a case in which N data $x_0$ to $x_{N-1}$ among the input complex signal are processed as shown in FIG. 4 (a). The weight coefficient generator 103, as described above, generates N filter coefficients $w_0$ to $w_{N-1}$ corresponding to the N data $x_0$ to $x_{N-1}$. They become the input filter coefficients for the arithmetic unit 116 at the first stage (FIG. 4 (d)) Thus in the arithmetic unit 116, the filter coefficient $w_i$ corresponds to the datum $x_i$, and the arithmetic operation of $$\sum_{i=0}^{N-1} x_i w_i$$

is executed by using N time periods (FIG. 4 (b)). The output gate 12 is opened upon completion of the addition of N results to supply to the output terminal 6.

Meanwhile, the input filter coefficients to the arithmetic unit 116 (FIG. 4 (d)) are delayed by the predetermined time period and become the input filter coefficients to the arithmetic unit 126 of the next stage (FIG. 4 (e)). There is a lag by one in the relationship between these input filter coefficients and the input data, with the filter coefficient $w_{(i-1)}$ corresponding to the input signal $x_i$ and so forth. The timing signal is also supplied with a lag of one each. Therefore, the arithmetic unit 126 executes the operation of $$\sum_{i=1}^{N} x_i w_{i-1}$$

(FIG. 4 (c)).

Similarly, in the succeeding arithmetic units 136 to 1N6, the required filter coefficients are successively inputted and, thus, the corresponding arithmetic operations are performed. Continuous processing thus takes place on a real-time basis. These operational results are added by the adding circuit 107, and the pulse compressed output is delivered from the output terminal 102.

To describe in further detail the operational timings of the arithmetic unit 116, the input state T of the delay 8, the output state T+ of the delay 8, the filter coefficients w and w+ at the input and output of the delay 7 and the output y from the output gate 12 are as tabulated below, where $x_i$ is an input datum.

| time | w | T | w' | T' | y |
| --- | --- | --- | --- | --- | --- |
| t = 0 | $w_0$ | 0 | 0 | 0 | 0 |
| t = 1 | $w_1$ | 0 | $w_0$ | 0 | 0 |
| t = 2 | $w_2$ | 0 | $w_1$ | 0 | 0 |
| t = 3 | $w_3$ | 0 | $w_2$ | 0 | 0 |
| . | | | | | |
| . | | | | | |
| t = N−1 | $w_{N-1}$ | 1 | $w_{N-2}$ | 0 | $\sum_{i=0}^{N-1} w_i x_i$ |
| t = N | $w_N$ | 0 | $w_{N-1}$ | 1 | 0 |

Thus, when t is (N - 1), the output y of $$\sum_{i=0}^{N-1} w_i x_i$$

is supplied.

Next, with respect to the arithmetic unit 126 of the next stage, the input datum $x_i$, the input filter coefficient w (the filter coefficient w' in the arithmetic unit 116), the output A of the multiplier 9, the output B of the adder 10, the output C of the delay 11, the input timing T, and the output y are as tabulated below.

| Time | x | w | A | B | C | T | y |
| --- | --- | --- | --- | --- | --- | --- | --- |
| t = 0 | $x_0$ | 0 | 0 | 0 | 0 | 0 | 0 |
| t = 1 | $x_1$ | $w_0$ | $x_1 w_0$ | $B_1 = x_1 w_0$ | 0 | 0 | 0 |
| t = 2 | $x_2$ | $w_1$ | $x_2 w_1$ | $B_2 = x_2 w_1 + B_1$ | $B_1$ | 0 | 0 |
| . | | | | | | | |
| t = N−1 | $x_{N-1}$ | $w_{N-2}$ | $x_{N-1} w_{N-2}$ | $B_{N-1} = x_{N-1} w_{N-2} + B_{N-2}$ | $B_{N-2}$ | 0 | 0 |
| t = N | $x_N$ | $w_{N-1}$ | $x_N w_{N-1}$ | $B_N = x_N w_{N-1} + B_{N-1}$ $= \sum_{i=1}^{N-1} w_{i-1} x_i$ | $B_{N-1}$ | 1 | $B_N$ |

Therefore, the arithmetic unit 116 of the first stage performs the processing based on the input data $x_0$ to $x_{N-1}$, and the arithmetic unit 126 performs the processing based on the input data $x_1$ to $x_N$. It is thus seen that convolutions are executed.

Next, the filter coefficient (the weight coefficient) according to the present invention will be described, hereinafter. As shown by the Equation (3), the pulse compression can be represented by $$y(k) = \sum_{i=0}^{N-1} w(i) \cdot x(i + k),$$

where i can be seen as i·Δt (Δt: the unit of time quantization) Since the reference signal for the pulse compression here is its own complex conjugate signal x*(i·Δt), the weight coefficient w(i·Δt) can be represented, in terms of its relationship to the window function factor P(i·Δt), by:

$$w(i \cdot \Delta t) = P(i \cdot \Delta t) \cdot x^*(i \cdot \Delta t) \tag{4}$$

The window function factor P(i·Δt) referred to above, used to sample data in the time domain, is commonly known to those skilled in the art as, for instance, the Fourier coefficient for use in a sampling system. While the window function factor, as it is for processing in the time domain, should be converted for use in the frequency domain in the FFT processing as stated above, the processing according to the present invention takes place in the time domain, and the window function factor can be multiplied by the reference signal to be treated as the weight coefficient. This is another significant advantage of the invention. As this reference signal is the complex conjugate signal of the transmitted signal in a radar system and accordingly is known in advance, the generation of the product of its multiplication by the window function factor as the weight coefficient can be readily accomplished.

Next will be described how the pulse compression ratio is altered. When the alteration of the compression ratio, i.e. that of the number of points to be processed, is to be achieved, the operating mode controller 105 is actuated. Thus each of the plurality of arithmetic units 116 to 1N6 is provided with the control circuit 14, which is so structured as to control the inactivation of the filtering operation or to control the choice between transferring and not transferring the outputs of the delays 7 and 8 to the next stage. Therefore, the operating mode controller 105 can control the prescribed number of the arithmetic units to actuate through the control circuits 14. At the same time, corresponding to an increase or a decrease in the number of the arithmetic units in operation, the number of filter coefficients delivered from the weight coefficient generator 103 is switched, and the output timing signal from the timing controller 104 is also altered. In short, the pulse compression ratio can be altered as desired merely by working the operating mode controller 105.

As hitherto described, the digital pulse compressing apparatus according to the present invention can be constructed in a simple manner with a plurality of arithmetic units each having the same configuration and sequentially transferring the filter coefficient and the timing signal to the next, and makes it possible to perform window function processing simultaneously with pulse compression processing in the time domain. Further, according to the present invention, the pulse compression ratio can be adaptively altered by changing the number of the arithmetic units to be worked.

What is claimed is:

1. A pulse compressing apparatus for use in a radar system transmitting a long pulse containing a modulated signal within, for converting a received signal into a short pulse, comprising:

weight coefficient generating means for generating a weight coefficient;

delaying means for successively delaying said weight coefficient to generate N weight coefficients differing in delay time;

N arithmetic means each for commonly receiving an input signal having a form of time series data sampled using a prescribed sampling period, for respectively receiving said N weight coefficients, for multiplying said input signal by the received weight coefficients to produce multiplication results and for adding said multiplication results up to a prescribed number M(M≦N) to generate a summed signal, said N arithmetic means generating N outputs each of which corresponds to said summed signal of each of said N arithmetic means; and adding means for adding M outputs out of said N outputs of said N arithmetic means to produce a compressed signal corresponding to said short pulse, wherein said number M is defined in accordance with a pulse compression ratio.

2. A pulse compressing apparatus for use in a radar system which transmits a long pulse containing a modulated signal within, for converting a received signal into a short pulse, comprising:

weight coefficient generating means for generating a predetermined number of weight coefficients in such a way that one weight coefficient at a time is generated and each weight coefficient is generated a predetermined amount of time after a preceding weight coefficient has been generated;

input means for receiving an input data signal corresponding to said received signal, said input data signal assuming values only during points in time spaced apart by said predetermined amount of time and the number of said points in time being equal to said predetermined number;

a plurality of arithmetic means, said plurality being equal to said predetermined number, each of said plurality of arithmetic means receiving said input data signal and said predetermined number of weight coefficients, each arithmetic means sequentially multiplying said predetermined number of input data signal values at said points in time by respective weight coefficients, and each arithmetic means adding up the results of the sequential multiplications to form a sub-sum wherein the total number of multiplications constituting said sub-sum equals said predetermined number, weight coefficients of said predetermined number to be applied to said plurality of arithmetic means having respective different time delays;

final addition means for adding a plurality of said sub-sums, said plurality of said sub-sums being equal to said predetermined number, to produce a compressed signal corresponding to said short pulse; and control means responsive to a pulse compression ratio for controlling said predetermined number so as to adapt the compressing apparatus to changes in radar system conditions.

3. A pulse compressing apparatus as claimed in claim 2, further comprising timing generating means responsive to said control means for generating a timing at which said sub-sum in each of said arithmetic means is delivered to said final addition means.

4. A pulse compressing apparatus as claimed in claim 3, in which each of said arithmetic means includes a delaying means for successively delaying said timing and for respectively supplying delayed timings to said plurality of arithmetic means.

5. A pulse compressing apparatus for use in a radar system transmitting a long pulse containing a modulated signal within, for converting a received signal into a short pulse, comprising:

weight coefficient generating means for generating a weight coefficient;

delaying means for successively delaying said weight coefficient to generate N weight coefficients differing in delay time;

N arithmetic means each for commonly receiving an input signal having a form of time series data sampled using a prescribed sampling period, for respectively receiving said N weight coefficients, for multiplying said input signal by the received weight coefficients to produce multiplication results and for adding said multiplication results up to a prescribed member M ($M \leq N$) to generate a summed signal, said N arithmetic means generating N outputs each of which corresponds to said summed signal of each of said N arithmetic means;

adding means for adding M outputs out of said N outputs of said N arithmetic means to produce a compressed signal corresponding to said short pulse; and controlling means responsive to a pulse compression ratio for controlling the operation of non-operation of said N arithmetic means to control the number M of the outputs of said N arithmetic means to be applied to said adding means and for controlling the number M of the multiplication results to be added in each arithmetic means.

6. A pulse compressing apparatus, as claimed in claim 5, wherein said coefficient generating means generates weight coefficients in a multiple of M in response to said control means.

7. A pulse compressing apparatus, as claimed in claim 3, wherein the number of the multiplied results added by said arithmetic means is M.

8. A pulse compressing apparatus, as claimed in claim 5, wherein said weight coefficient is represented by the product of a complex conjugate signal of the transmitted pulse and a window function factor.

9. A pulse compressing apparatus, as claimed in claim 5, further comprising timing generating means responsive to said control means for generating a timing at which the added multiplication result in each of said N arithmetic means is delivered, and delaying means for successively delaying said timing and respectively supplying delayed timings to said N arithmetic means.

* * * * *

UNITED STATES PATENT AND TRADEMARK OFFICE
CERTIFICATE OF CORRECTION

PATENT NO. : 5,036,328
DATED : July 30, 1991
INVENTOR(S) : Hiroshi Nakamura and Eiichi Kiuchi It is certified that error appears in the above-identified patent and that said Letters Patent is hereby corrected as shown below:

Col. 1, line 60, delete "FET" insert --FFT--

Col. 2, line 9, delete "$B_{96}$" insert -- $B_r$ --

Col. 6, line 41, delete "datam" insert -- datum--

Signed and Sealed this

Twenty-fourth Day of November, 1992

*Attest:*

DOUGLAS B. COMER

*Attesting Officer*     Acting Commissioner of Patents and Trademarks